United States Patent [19]

Okamoto

[11] Patent Number: 5,574,342
[45] Date of Patent: Nov. 12, 1996

[54] BRUSHLESS MOTOR

[75] Inventor: Kenjiro Okamoto, Kyoto, Japan

[73] Assignee: Nidec Corporation, Kyoto, Japan

[21] Appl. No.: 420,867

[22] Filed: Apr. 12, 1995

[30] Foreign Application Priority Data

Apr. 14, 1994 [JP] Japan .................. 6-076030
May 19, 1994 [JP] Japan .................. 6-105291

[51] Int. Cl.⁶ .................................... H02K 29/03
[52] U.S. Cl. ................ 318/254; 310/68 R; 310/179; 310/186; 310/254
[58] Field of Search ................ 318/138, 254, 318/439, 685, 696, 701; 310/49 R, 68 R, 152, 156, 162, 179, 184, 185, 186, 210, 254

[56] References Cited

U.S. PATENT DOCUMENTS 4,100,473 7/1978 Lawrenson et al. .
4,371,802 2/1983 Morrill .
4,484,114 11/1984 Ebbs .
4,968,921 11/1990 Giardini .

FOREIGN PATENT DOCUMENTS 59-61484 9/1982 Japan .
6-121510 10/1992 Japan .

*Primary Examiner*—Bentsu Ro
*Attorney, Agent, or Firm*—McCormick, Paulding & Huber

[57] ABSTRACT

A brushless motor comprises a stator having a drive coil and a stator core, and a rotor. The stator has a plurality of main teeth and a plurality of auxiliary teeth arranged between the plurality of main teeth. The drive coil comprises a main coil and first and second sub coils. The main coil is wound around the plurality of main teeth in such a way that winding directions on adjacent main teeth become opposite to each other. The first sub coil is wound on every other one of the plurality of auxiliary teeth in such a way as to have a same winding direction. The second sub coil is wound on remaining auxiliary teeth in such a way as to have a same winding direction. The winding directions of the first and second sub coils are the same.

13 Claims, 4 Drawing Sheets

BRUSHLESS MOTOR

BACKGROUND OF THE INVENTION

1. Field of the Invention

The present invention relates to a brushless motor, and, more particularly, to a brushless motor which can avoid the activation failure at the time it is activated.

2. Description of the Related Art

In general, a brushless motor has a housing and a rotor which is rotatable in relative to this housing. An annular rotor magnet is attached to this rotor, and a stator is attached to the housing, facing the rotor. The stator has a stator core and a drive coil wound around a plurality of teeth of the stator core. As the required current is supplied to the drive coil, the rotor rotates.

A uni-phase bipolar driving system is known as a driving system for such a brushless motor. According to this driving system, one drive coil is wound around all the teeth of the stator in the specified manner, and a drive current in a predetermined direction and a drive current in the opposite direction to this predetermined direction are alternately supplied to this drive coil. With regard to the stator, position detecting means like a Hall element is provided so that the current to be supplied to the drive coil is controlled on the basis of the output signal of the position detecting means.

In the conventional brushless motor which uses the uni-phase bipolar driving system, however, the generated driving torque has the characteristic curve of a pulsating current so that there is a dead point between peaks of the curve at which the value becomes substantially zero. At the time of the activation of the motor, therefore, the motor may fail to start due to this dead point.

SUMMARY OF THE INVENTION

Accordingly, it is an object of the present invention to provide a brushless motor capable of surely avoiding the activation failure.

It is another object of this invention to provide a brushless motor capable of reducing the consumed power.

The other objects and features of this invention may best be understood by the following description.

DETAILED DESCRIPTION OF THE PREFERRED EMBODIMENT

Figure 1:
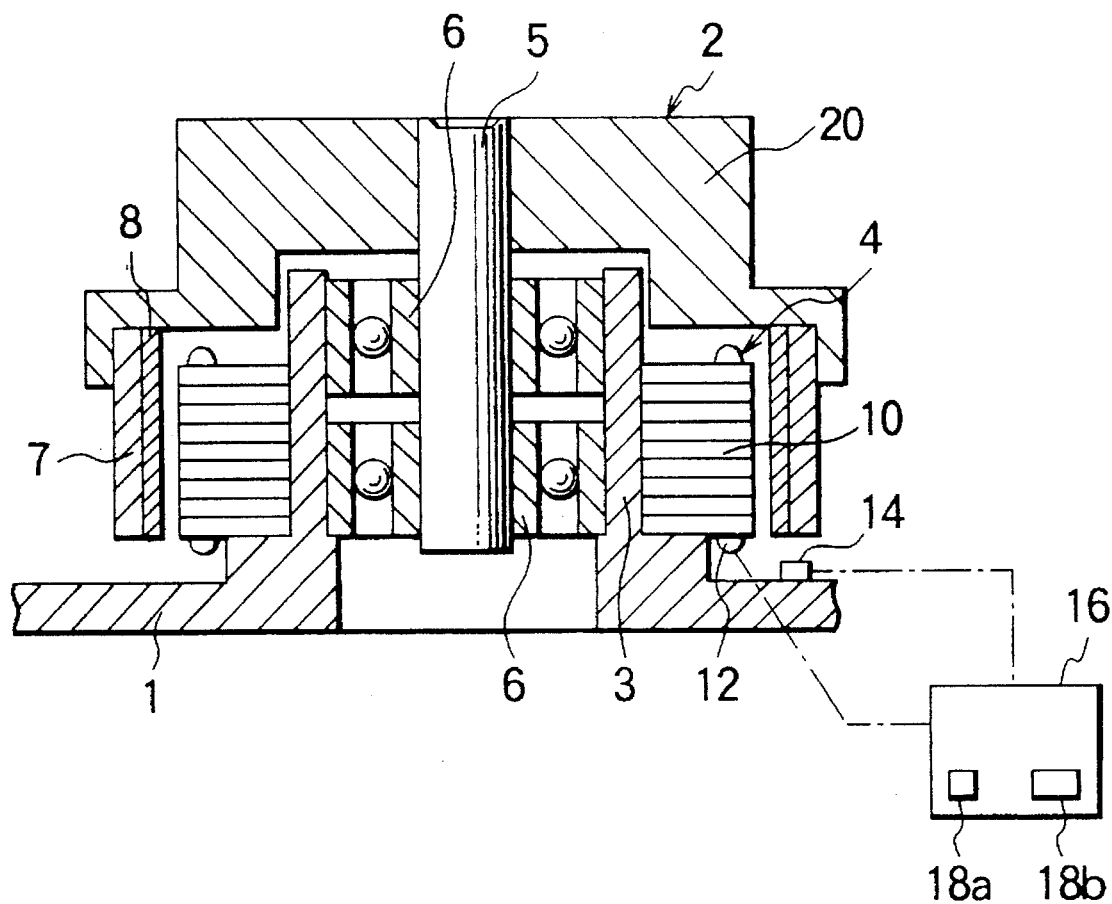
FIG. 1 is a cross-sectional view schematically showing one specific example of a brushless motor according to the present invention.

A preferred embodiment of the present invention will now be described referring to the accompanying drawings. FIGS. 1 through 4 illustrate a brushless motor according to one embodiment of this invention. The illustrated brushless motor has a housing 1 and a rotor 2. A hollow cylinder portion 3 is provided in the center of the housing 1, with an annular stator 4 secured on the outer surface of the hollow cylinder portion 3. The structure of the stator 4 will be discussed in detail later.

The rotor 2 comprises a hub 20 on which, for example, a recording disk (not shown) is to be mounted, and a yoke 7 attached to the hub 20. A rotary shaft 5 is provided vertically in the center of the rotor hub 20, and is rotatably supported in the hollow cylinder portion 3 of the housing 1 via a pair of bearings 6. An annular magnet 8 is secured on the inner wall of the annular yoke 7 attached to the rotor hub 20.

Figure 2:
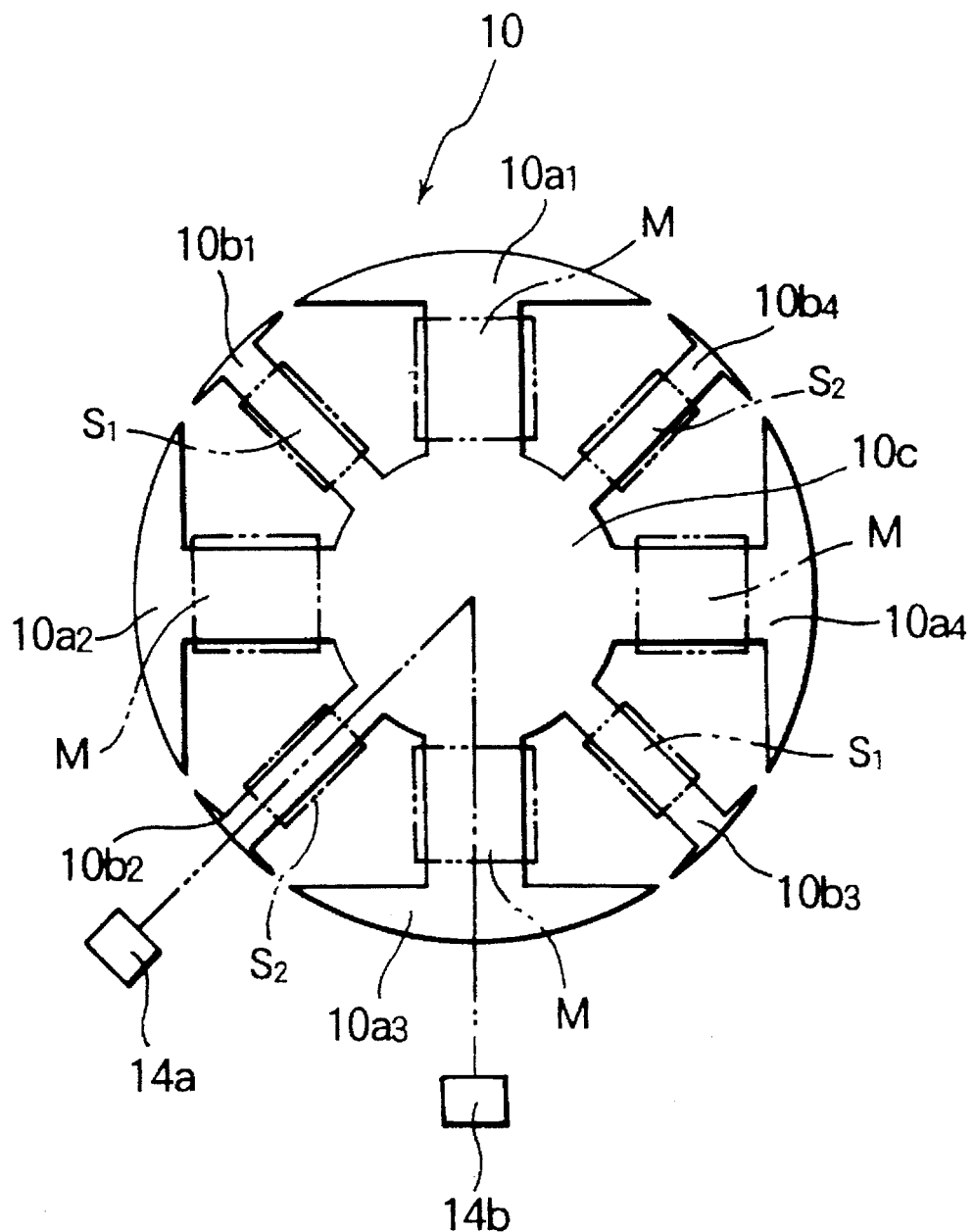
FIG. 2 is a plan view schematically showing the stator of the motor in FIG. 1.

The stator 4 of the brushless motor embodying this invention has a stator core 10 and drive coil means 12 wound around the stator core 10 which is formed in the shape as shown in FIG. 2. The stator core 10 has a plurality of core plates, punched in the same shape by press working or the like, stacked one on another, a plurality of main teeth $10_{a1}$ to $10_{a4}$ and a plurality of auxiliary teeth $10_{b1}$ to $10_{b4}$ arranged between those main teeth $10_{a1}$–$10_{a4}$.

In this embodiment, the main teeth $10_{a1}$ to $10_{a4}$, four in number, are provided substantially at equal angular distances of 90 degrees, radially extending outward from a disk-shaped proximal end portion $10c$. The auxiliary teeth $10_{b1}$ to $10_{b4}$, four in number, are provided substantially at equal angular distances of 90 degrees between the main teeth $10_{a1}$ to $10_{a4}$, radially extending outward from the disk-shaped proximal end portion $10c$. The main teeth $10_{a1}$ to $10_{a4}$ serve to obtain the main driving torque; as the circumferential width of the main teeth $10_{a1}$ to $10_{a4}$ increases, the driving torque increases, and as this circumferential width decreases, the driving torque decreases.

The auxiliary teeth $10_{b1}$ to $10_{b4}$ serve to obtain the auxiliary driving torque to delete the dead points. As the circumferential width of the auxiliary teeth $10_{b1}$ to $10_{b4}$ increases, the auxiliary driving torque increases (as a consequence of increasing the auxiliary driving torque, the width of the main teeth $10_{a1}$ to $10_{a4}$ becomes narrower, reducing the main driving torque to be generated), and as this circumferential width decreases, the auxiliary driving torque decreases (as a consequence of decreasing the auxiliary driving torque, the width of the main teeth $10_{a1}$ to $10_{a4}$ becomes wider, increasing the main driving torque to be generated).

In consideration of the above, the ratio of the width of the main teeth $10_{a1}$ to $10_{a4}$ to the width of the auxiliary teeth $10_{b1}$ to $10_{b4}$ is set approximately to 3:1 in this embodiment. It is possible to set the width of the main teeth $10_{a1}$–$10_{a4}$ to about 2 to 5 times the width of the auxiliary teeth $10_{b1}$–$10_{b4}$.

The drive coil means 12 comprises a main coil M and two sub coils $S_1$ and $S_2$. (The sub coil $S_1$ constitutes the first sub coil, and the other sub coil $S_2$ constitutes the second sub coil.) The main coil M is wound around the main teeth $10_{a1}$ to $10_{a4}$ shown in FIG. 2 alternately in different directions between the circumferentially adjoining main teeth $10_{a1}$–$10_{a4}$. If the main coil M is wound around the main teeth $10_{a1}$ counterclockwise, the main coil M is wound around the circumferentially adjoining main teeth $10_{a2}$ clockwise, is wound around the main teeth $10_{a3}$ counterclockwise, and is wound around the main teeth $10_{a4}$ clockwise, and those turns are connected in series.

The two sub coils $S_1$ and $S_2$ are wound around the auxiliary teeth $10_{b1}$ to $10_{b4}$ shown in FIG. 2 in such a manner that the winding direction of the sub coil $S_1$ on the auxiliary teeth $10_{b1}$ and $10_{b3}$ is the same and the winding direction of the sub coil $S_2$ on the auxiliary teeth $10_{b2}$ and $10_{b4}$ is the same. In other words, if the sub coil $S_1$ is wound around the auxiliary teeth $10_{b1}$ counterclockwise, the sub coil $S_2$ is wound around the auxiliary teeth $10_{b2}$ counterclockwise, the sub coil $S_1$ is wound around the auxiliary teeth $10_{b3}$ counterclockwise, and the sub coil $S_2$ is wound around the auxiliary teeth $10_{b4}$ counterclockwise.

There is a magnetic sensor 14 (position detecting means) for detecting the rotational angular position of the rotor 2. In this embodiment, the magnetic sensor 14 comprises a pair of magnetic sensors 14a and 14b arranged at an angular distance of 45 degrees in association with the angular relation between the main teeth $10_{a1}$ to $10_{a4}$ and the auxiliary teeth $10_{b1}$ to $10_{b4}$; the relative positional relation between those magnetic sensors 14a and 14b are illustrated in FIG. 2. (The magnetic sensor 14a constitutes the first position detecting means and the other magnetic sensor 14b constitutes the second position detecting means.) In this embodiment, the magnetic sensor 14a is located outside a specific auxiliary tooth, $10_{b2}$, in the radial direction from the circumferential center thereof, and the other magnetic sensor 14b is located outside a specific main tooth, $10_{a3}$, in the radial direction from the circumferential center thereof.

Figure 3:
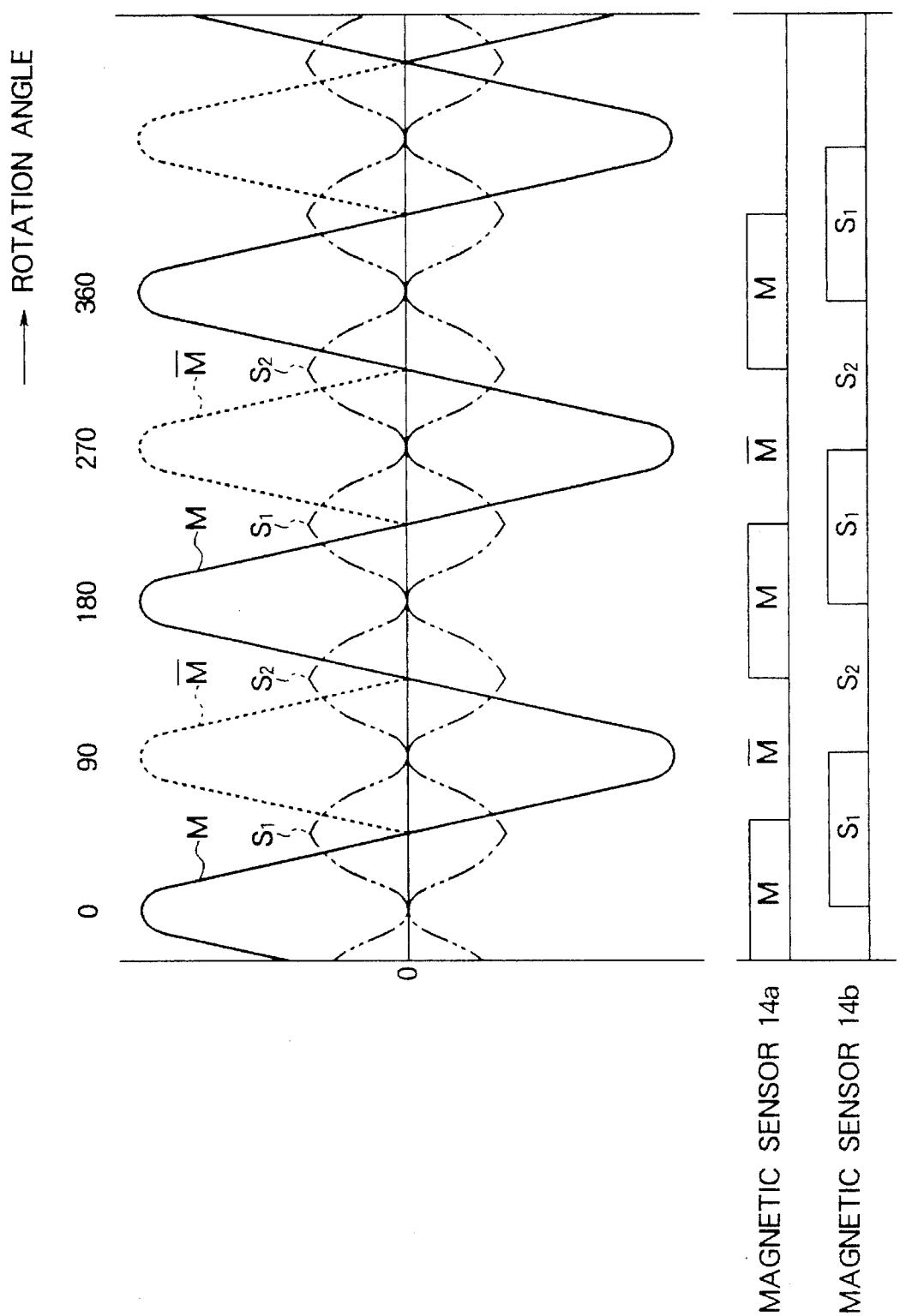
FIG. 3 is a waveform diagram illustrating the counter electromotive force induced on each coil of the motor in FIG. 1.

According to the thus constituted brushless motor, when the rotor 2 is rotated without supplying a current to the drive coil means 12 (main coil M and sub coils $S_1$ and $S_2$), a counter electromotive force is produced on each coil interlinked with magnet 8. This counter electromotive force has a waveform as shown in FIG. 3. In this embodiment, the main teeth $10_{a1}$ to $10_{a4}$ are arranged substantially at the equal angular distances of 90 degrees and the one-phase main coil M is wound around the main teeth $10_{a1}$–$10_{a4}$. As the turning direction of the main coil M alternately differs on the circumferentially adjoining main teeth, the counter electromotive force induced on the main coil M has a nearly sine wave as indicated by the solid line in FIG. 3.

In this embodiment, the rotor magnet 8 is magnetized to four poles with the N pole and the S pole arranged substantially at the distance of 90 degrees. Produced on the sub coil $S_1$ wound on the auxiliary teeth $10_{b1}$ and $10_{b3}$ is a counter electromotive force which has a nearly sine wave showing a peak at an angle delay of substantially 45 degrees from the counter electromotive force induced on the main coil M as indicated by the one-dot chain line in FIG. 3. Produced on the sub coil $S_2$ wound on the auxiliary teeth $10_{b2}$ and $10_{b4}$ is a counter electromotive force which has a nearly sine wave showing a peak at an angle delay of substantially 135 degrees from the counter electromotive force induced on the main coil M as indicated by the two-dot chain line in FIG. 3.

The magnetic sensor 14a serves to switch the exciting current to be supplied to the main coil M, and the other magnetic sensor 14b serves to switch the exciting current to be supplied to the sub coils $S_1$ and $S_2$. Based on the detection signals from the magnetic sensors 14a and 14b, control means 16 supplies the currents (which will be discussed shortly) to the main and sub coils M, $S_1$ and $S_2$.

The control means 16 includes first current control means 18a for controlling the current to be supplied to the main coil M and second current control means 18b for controlling the currents to be supplied to the sub coils $S_1$ and $S_2$. The output signal of the magnetic sensor 14a is supplied to the first current control means 18a, which supplies the exciting current in a predetermined direction, e.g., the forward direction, to the main coil M when the detection signal from the magnetic sensor 14a is "H" and supplies the exciting current in the opposite direction to the predetermined direction (i.e., the reverse direction) when the detection signal is "L."

When such an exciting current is supplied to the main coil M, the main coil M is activated in a uni-phase bipolar manner, thus generating the main driving torque with its portion in one direction in the solid-line waveform in FIG. 3 being inverted to the + side as indicated. The output signal of the other magnetic sensor 14b is supplied to the second current control means 18b, which supplies the exciting current to the sub coil $S_1$ when the detection signal from the magnetic sensor 14b is "H" and supplies the exciting current to the sub coil $S_2$ when the detection signal is 37 L."

Figure 4:
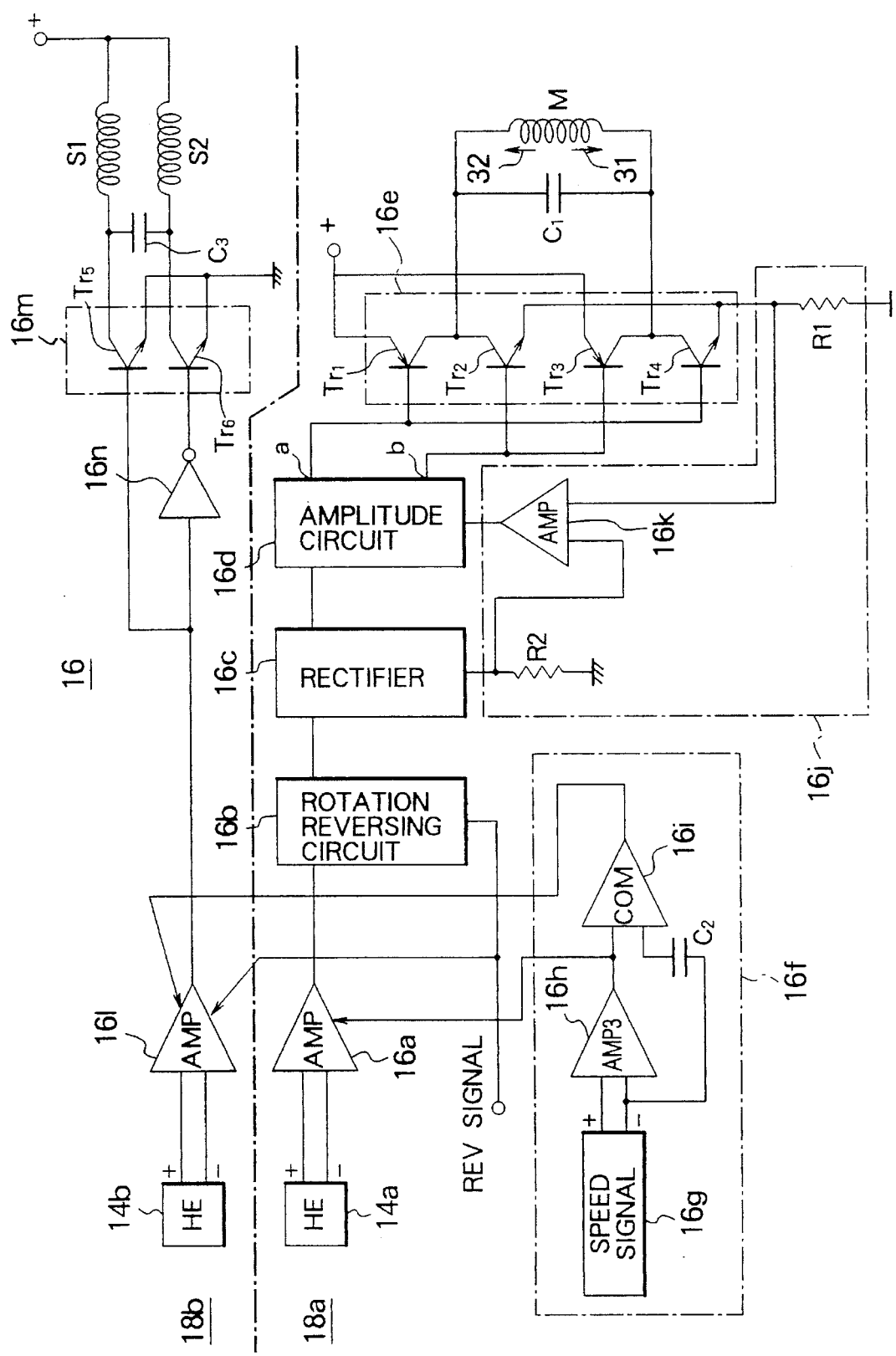
FIG. 4 is a circuit diagram exemplifying control means adapted for the motor in FIG. 1.

FIG. 4 shows a specific example of the control means 16 adapted for the brushless motor according to this invention. The illustrated control means 16 has the first current control means 18a for controlling the current to be supplied to the main coil M and the second current control means 18b for controlling the currents to be supplied to the sub coils $S_1$ and $S_2$ as mentioned above. The first current control means 18a has an amplifier 16a connected to the output side of the magnetic sensor 14a, a rotation reversing circuit 16b connected to the output side of the amplifier 16a, a rectifier 16c connected to the output side of the rotation reversing circuit 16b, an amplitude circuit 16d connected to the output side of the rectifier 16c, and a driver circuit 16e connected to the output side of the amplitude circuit 16d.

The driver circuit 16e comprises four transistors Tr1 to Tr4 connected in a bridge. One output terminal a of the amplitude circuit 16d is connected to the node between the base of the transistor Tr1 and the base of the transistor Tr4 and the other output terminal b of the amplitude circuit 16d is connected to the node between the base of the transistor Tr2 and the base of the transistor Tr3.

One end of the main coil M is connected to the node between the bases of the transistors Tr1 and Tr2 and the other end of the main coil M is connected to the node between the bases of the transistors Tr3 and Tr4. The emitters of the transistors Tr1 and Tr3 are connected to the positive potential and the emitters of the transistors Tr2 and Tr4 are connected to the ground via a resistor R1. A capacitor C1 for preventing oscillation is connected in parallel to the main coil M.

The amplifier 16a amplifies the detection signal from the magnetic sensor 14a, and has a control terminal connected to a speed controller 16f for controlling the rotational speed of the motor. This speed controller 16f comprises a speed signal generator 16g for producing a speed signal based on the output signal of a speed sensor or the like coupled to the rotary shaft of the motor, an amplifier 16h, a comparator 16i and a capacitor C2 for setting a reference voltage.

Connected to the amplitude circuit 16d is an overcurrent preventing circuit 16j which prevents an overcurrent from flowing through the main coil M. This overcurrent preventing circuit 16j has an amplifier 16k which is supplied with the terminal voltage of the resistor R1 connected in series to the main coil M and the terminal voltage of a resistor R2 connected to the rectifier 16c. When the current flowing across the resistor R1 becomes equal to or greater than a predetermined value, the overcurrent preventing circuit 16j stops the operation of the amplitude circuit 16d to inhibit the supply of the exciting current to the main coil M.

The second current control means 18b has an amplifier 16l connected to the magnetic sensor 14b and a driver circuit 16m connected to the output side of the amplifier 16l. The output of the amplifier 16l is separated to two, one connected directly to the driver circuit 16m and the other connected via an inverter 16n to the driver circuit 16m.

The driver circuit 16m has a pair of transistors Tr5 and Tr6. The transistor Tr5 has a base connected to the output side of the amplifier 16l and a collector connected to the sub coil $S_1$. The transistor Tr6 has a base connected to the output side of the inverter 16n and a collector connected to the sub coil $S_2$.

The other ends of the sub coils $S_1$ and $S_2$ are connected to the positive potential, and the emitters of the transistors Tr5 and Tr6 are grounded. A fly-back capacitor C3 is provided between the collectors of the transistors Tr5 and Tr6. When the rotor 2 rotates, the magnetic sensors 14a and 14b of the thus constituted control means 16 send output signals of a nearly sine wave which invert in the periods of 90 degrees. At this time, the magnetic sensors 14a and 14b has a phase difference of 45 degrees corresponding to the positional relation between those sensors 14a and 14b.

A fly-back clamp diode may be used in place of the capacitor C3. The output signals of the magnetic sensors 14a and 14b are amplified by the amplifier 16a and are then input via the rotation reversing circuit 16b to the rectifier 16c.

The amplitude circuit 16d sends a signal from its terminal a to the driver circuit 16e. In the driver circuit 16e having received this signal, the transistors Tr1 and Tr4 are activated so that the exciting current flowing downward as indicated by an arrow 31 is supplied to the main coil M.

When the amplitude circuit 16d sends a signal from its terminal b to the driver circuit 16e, the transistors Tr2 and Tr3 are activated so that the exciting current flowing upward as indicated by an arrow 32 is supplied to the main coil M. Thereafter, the same operation is repeated.

The signal sending cycle here is the cycle of the output signal of the magnetic sensor 14a, and corresponds to the arrangement of the main teeth $10_{a1}$ to $10_{a4}$. Therefore, the exciting current in the forward direction is supplied to the main coil M when the detection signal from the magnetic sensor 14a is "positive" and the exciting current in the reverse direction is supplied to the main coil M when this detection signal is "negative."

When such an exciting current is supplied to the main coil M, the main coil M is activated in a uni-phase bipolar manner, thus generating the main driving torque with its portion in one direction in the solid-line waveform in FIG. 3 being inverted to the + side as indicated. In the second current control means 18b, the magnetic sensor 14b sends its output signal to the amplifier 16l, and the amplified signal is then input to the driver circuit 16m.

Since the amplified signal is input via the inverter 16n to the transistor Tr6 at this time, the transistor Tr5 is enabled to supply the exciting current to the sub coil $S_1$ when the output signal of the magnetic sensor 14b is "positive" and the transistor Tr6 is enabled to supply the exciting current to the sub coil $S_2$ when the output signal of the magnetic sensor 14b is "negative."

When such a current is supplied, the auxiliary driving torque is produced by the sub coils $S_1$ and $S_2$ at the dead point that occurs when the main coil M is activated in a uni-phase bipolar manner as shown in FIG. 3 since the output signal of the magnetic sensor 14b has a phase delay of 45 degrees with respect to the output signal of the magnetic sensor 14a. As a result, the occurrence of the dead point which has been the shortcoming of the uni-phase bipolar driving system is eliminated, thus significantly improving the starting characteristic of the motor.

If the rotational speed of the motor is higher than the set value in the above-described control sequence, the speed controller 16f sends a control signal to the amplifier 16a via the amplifier 16h to reduce the gain of the amplifier 16a. This reduces the exciting current to be supplied to the main coil M to decrease the rotational speed of the motor. If the rotational speed of the motor is lower than the set value, the reverse operation is performed to increase the rotational speed of the motor.

When the rotational speed of the motor reaches the set value, a control signal is supplied via the comparator 16i to the amplifier 16l, so that the amplifier 16l is disabled to stop the supply of the exciting current to the sub coils $S_1$ and $S_2$.

This control is executed because the sub coils $S_1$ and $S_2$ are provided to eliminate the dead point of the motor and it is desirable to supply the exciting current to the sub coils $S_1$ and $S_2$ only at the starting time in order to reduce the consumed power. It is desirable that the rotational speed be set in such a way that for the motor having a rated speed of 800 rpm, for example, the supply of the exciting current to the sub coils $S_1$ and $S_2$ is inhibited when the rotational speed reaches about a half of the rated speed or 400 rpm.

The sub coils $S_1$ and $S_2$ serve just to eliminate the dead point of the motor at the starting time, so that it is insignificant to supply the exciting current to the sub coils $S_1$ and $S_2$, though possible, after the activation of the motor. Even if the exciting current is supplied to the sub coils $S_1$ and $S_2$, the torque to be generated is small for the actual power consumed. In this respect, it is desirable to execute the above-described control.

This low power consumption type brushless motor is suitable particularly when the load is rotated, and is adapted for motors for driving a CD-ROM, LBP mirror and a magnetic disk like a hard disk. As the load acts as inertia in the motor which rotates such a medium, a sufficient torque can be obtained without supplying the current to the sub coils after the motor is activated.

Although the main teeth $10_{a1}$ to $10_{a4}$ and the auxiliary teeth $10_{b1}$ to $10_{b4}$ are illustrated as a 4-pole type in the foregoing description of this embodiment, the present invention is not restricted to this type, but may be applied to other types as long as the number of teeth is an even number equal to or greater than 4. Although the illustrated brushless motor of this embodiment has a rotational shaft, the present invention may be applied to a shaft-fixed type of brushless motor.

Since the brushless motor of this invention can eliminate the dead point occurring at the time the motor is activated, the motor's starting reliability becomes considerably high. Further, the exciting current is supplied to the sub coils which eliminate the dead point, only at the starting time, so that the consumed power can be reduced.

What is claimed is:

1. A brushless motor comprising:

a stator having drive coil means and a stator core on which said drive coil means is wound;

a rotor rotatable in relative to said stator;

a magnet attached to said rotor in such a way as to face said stator; and position detecting means for detecting a rotational angular position of said rotor and control means for controlling a current to be supplied to said drive coil means based on an output signal of said position detecting means, said stator having a plurality of main teeth and a plurality of auxiliary teeth arranged between said plurality of main teeth, said drive coil means comprising a main coil and first and second sub coils, said main coil being wound around said plurality of main teeth in such a way that winding directions on adjacent main teeth become opposite to each other, said first sub coil being wound on every other one of said plurality of auxiliary teeth in such a way as to have a same winding direction, said second sub coil being wound on remaining auxiliary teeth in such a way as to have a same winding direction, winding directions of said first and second sub coils being the same.

2. The brushless motor according to claim 1, wherein said plurality of main teeth and said plurality of auxiliary teeth are arranged on said stator core in a circumferential direction at substantially equal distances.

3. The brushless motor according to claim 1, wherein said control means includes first current control means for controlling a current to be supplied to said main coil, and second current control means for controlling a current to be supplied to said first and second sub coils.

4. The brushless motor according to claim 3, wherein said position detecting means comprises first position detecting means arranged in association with a specific auxiliary tooth and second position detecting means arranged in association with a specific main tooth, said first current control means controls said current to be supplied to said main coil based on an output signal of said first position detecting means and said second current control means controls said current to be supplied to said first and second sub coils based on an output signal of said second position detecting means.

5. The brushless motor according to claim 4, wherein said second current control means supplies said current to be supplied to said first and second sub coils until said rotor reaches a predetermined number of rotations at a time said motor is started.

6. The brushless motor according to claim 4, wherein said first current control means alternately switches a direction of a current to be supplied to said main coil based on an output signal of said first position detecting means, and said second current control means alternately switches supply of a current to said first and second sub coils based on an output signal of said second position detecting means.

7. The brushless motor according to claim 4, wherein said specific main tooth and said specific auxiliary tooth are positioned adjacent to each other.

8. The brushless motor according to claim 4, wherein said first position detecting means is located outside said specific auxiliary tooth in a radial direction from a circumferential center thereof.

9. The brushless motor according to claim 4, wherein said second position detecting means is located outside said specific main tooth in a radial direction from a circumferential center thereof.

10. A brushless motor comprising:

a stator having drive coil means and a stator core on which said drive coil means is wound;

a rotor rotatable in relative to said stator;

a magnet attached to said rotor in such a way as to face said stator; and position detecting means for detecting a rotational angular position of said rotor and control means for controlling a current to be supplied to said drive coil means based on an output signal of said position detecting means, said stator having four main teeth and four auxiliary teeth arranged between said four main teeth, said drive coil means comprising a main coil and first and second sub coils, said main coil being wound around said four main teeth in such a way that winding directions on adjacent main teeth become opposite to each other, said first sub coil being wound on every other one of said four auxiliary teeth in such a way as to have a same winding direction, said second sub coil being wound on remaining auxiliary teeth in such a way as to have a same winding direction, winding directions of said first and second sub coils being the same.

11. The brushless motor according to claim 10, wherein said control means includes first current control means for controlling a current to be supplied to said main coil, and second current control means for controlling a current to be supplied to said first and second sub coils.

12. The brushless motor according to claim 11, wherein said position detecting means comprises first position detecting means arranged in association with a specific auxiliary tooth and second position detecting means arranged in association with a specific main tooth, said first position detecting means and said second position detecting means being arranged at substantially an angle of 45 degrees in a rotational direction of said rotor, said first current control means controls said current to be supplied to said main coil based on an output signal of said first position detecting means and said second current control means controls said current to be supplied to said first and second sub coils based on an output signal of said second position detecting means.

13. The brushless motor according to claim 11, wherein said second current control means supplies said current to be supplied to said first and second sub coils until said rotor reaches a predetermined number of rotations at a time said motor is started.

* * * * *